Patented Mar. 14, 1939

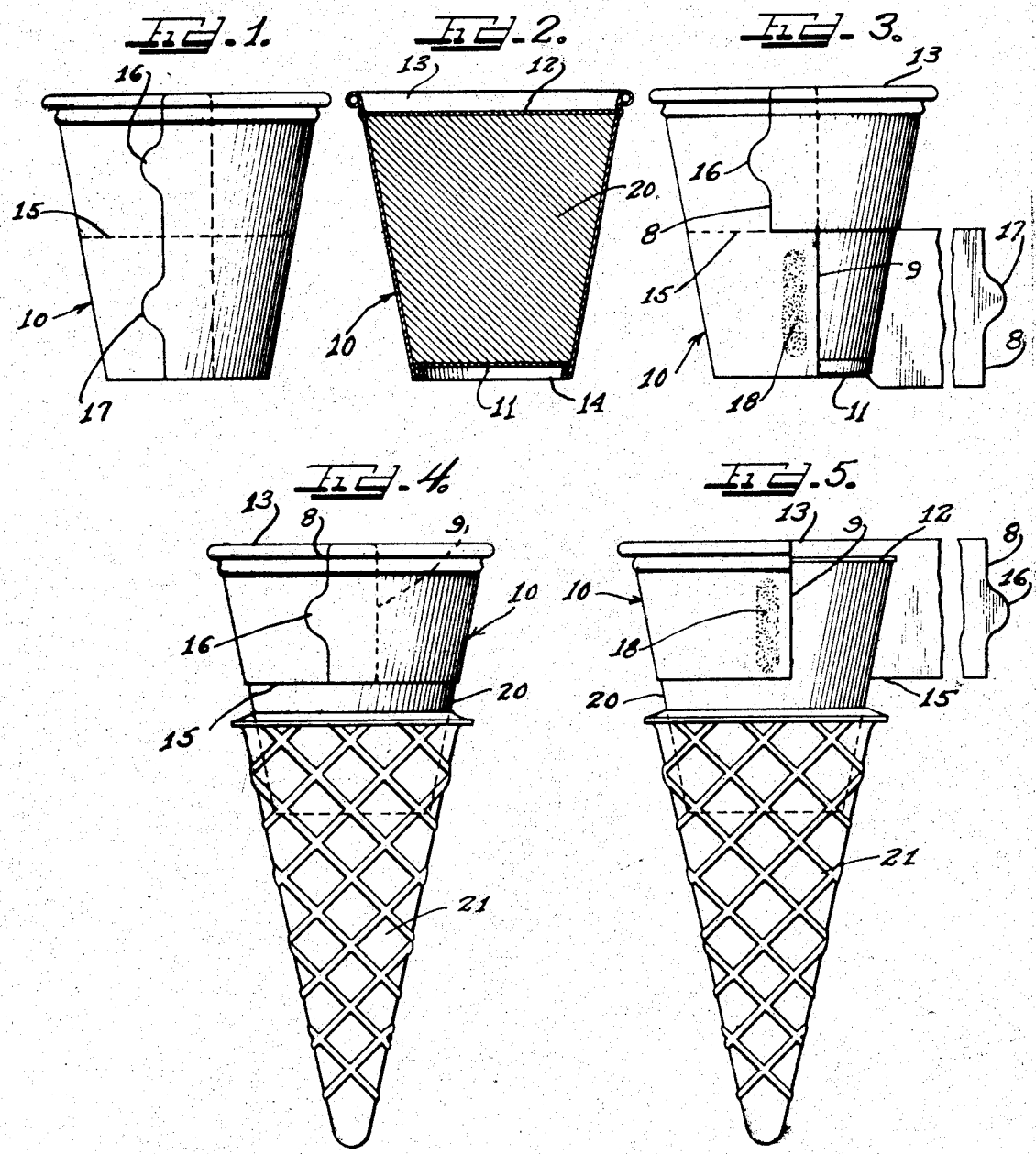

2,150,207

UNITED STATES PATENT OFFICE 2,150,207

FLAT BOTTOM ICE CREAM CONTAINER

Thomas D. Currie, Vaughan Township, Ontario, Canada, assignor to Dixie-Vortex Company, a corporation of Delaware Application January 9, 1936, Serial No. 58,301

1 Claim. (Cl. 229—51)

This invention relates to a flat bottom container for edibles such as confectioneries, and more particularly ice cream.

An object of this invention is to provide an improved container for ice cream of the like which is of a segmental construction, so that the lower half thereof may be first removed from the ice cream to permit of the introduction of the exposed portion of the ice cream in an edible cone without necessitating removal of the upper segment or half of the container from the ice cream.

Another object of this invention is to provide a flat bottom ice cream container embodying the invention of Wood Patent No. 1,964,238, but in addition thereto having a flat bottom which can be removed with a lower portion of the container from a frozen mass disposed therein.

Still another object of this invention is to provide a flat bottom ice cream container with the inventive concept disclosed and claimed in the aforesaid patent.

A still further object of the invention is to provide a wrapper for a conical-like mass of frozen ice cream, which wrapper consists of a number of segments connected together by scored portions whereby, upon removal of the lower part of the wrapper or container, the exposed part of the ice cream mass can be inserted in an edible cone, leaving the top of such mass still covered by the upper part or portion of the wrapper or container.

In accordance with the general features of this invention, there is provided a flat bottom cup made from a paper blank having overlapped edges connected by a glued seam of such character as to permit of said edges being readily separated in the stripping of the cup from a frozen mass of ice cream, the cup consisting of at least two parts or segments connected by a scored portion whereby the lower part may be first removed from the frozen mass to permit of its introduction in the upper end of an edible cone, and leaving the upper portion of the ice cream mass covered by the upper part of the cup, which part of the cup is adapted to be readily stripped from the ice cream when the user desires to consume the same.

Another feature of the invention relates to the provision of a bottom connected to the lower part of the cup and a lid connected to the upper part of the cup, each of which is separately removable with its respective part of the cup.

Other objects and features of this invention will more fully appear from the following detailed description, taken in connection with the accompanying drawing, which illustrates a single embodiment thereof, and in which:

Figure 1 is an elevation of a frusto-conical flat bottom cup embodying the features of this invention and having a frozen mass of confectionery or ice cream disposed therein;

Figure 2 is a vertical sectional view through the structure shown in Figure 1;

Figure 3 is an elevation similar to Figure 1, but illustrating a lower part or half of the cup in the process of being removed from the frozen mass;

Figure 4 shows the structure of the other figures with the lower part of the wrapper completely removed and the exposed portion of the ice cream disposed in the open end of an edible cone; and Figure 5 is a view similar to Figure 4, but illustrating the upper part of the cup in the process of being removed from the top of the frozen ice cream mass.

As shown in the drawing:

The reference character 10 designates a frusto-conical cup of the flat bottom type, including a flat bottom 11 and a lid 12. The wall of the cup 10 is made from a paper blank having curved inner and outer edges 13 and 14 for defining the mouth and the lower opening, respectively, of the cup. This blank also has lateral edges which diverge outwardly and which edges are designated by the reference numerals 8 and 9. A blank of this general type is well known in the flat bottom paper cup art, and needs no further description or illustration.

The novel features of this invention relate to the provision of this blank with an intermediate scored or perforated portion 15, and with upper and lower stripping tabs 16 and 17, one for each of the halves of the cup separated by the intermediate scored portion 15. Also, the edge portions 8 and 9 of the cup are secured together by dabs or a strip of adhesive 18 of such amount and character as merely to hold the cup in shape, but being insufficient to preclude ready separation of the side edges when the cup halves or segments are progressively stripped from the frozen confection 20 therein. In other words, this flat bottom cup has embodied in it the novel patented gluing concept of the aforesaid Wood Patent No. 1,964,238.

The bottom 11 of the cup is in the form of a disk and may, if desired, be interlocked or secured in any other suitable manner to the lower part or segment of the cup so as to be removable therewith when the same is stripped from the frozen mass 20. In addition thereto, the package may, if it is so desired, be provided with a lid 12, although it is to be understood that the use of the lid 12 is optional, depending upon whether it is desired to conceal and protect the top end of the frusto-conical mass 20. In the event a lid 12 is used, it is made in the form of a circular disk which may be crimped as illustrated or otherwise secured to the wall of the cup 10.

The cup illustrated may be manufactured on a large production basis by suitable cup-making machinery, and may be sold to ice cream manufacturers to be filled with a suitable confection, such as ice cream, which is frozen in the cup. After the mass 20 has been disposed in the cup, and if desired, prior to the freezing of the same, a lid 12 is disposed at the top of the mass and frozen to the mass 20.

When a consumer obtains one of these frozen packages, the lower half or segment of the cup can be progressively stripped from the lower part of the frozen mass 20, as illustrated in Figure 3. This stripping operation is performed by the consumer or dispenser pulling the stripping tab 17 to separate the glued edges of this half of the cup, thus exposing the lower part of the frozen ice cream. During this stripping operation, the bottom 11 is removed with the lower segment or half of the wall of the cup.

With the lower part or half of the frozen mass 20 thus exposed, such exposed ice cream mass is then inserted in the upper or mouth end of an edible cone 21, as shown in Figure 4. When thus inserted in the cone 21, the upper segment or portion of the ice cream is still protected and covered by the upper segment or half of the wrapper or cup, as shown in Figure 4. This enables the upper end of the frusto-conical mass of ice cream to be protected from dirt and other foreign matter until it is desired to consume the same. Thereafter, the upper segment or half of the cup, including the lid 12, can be progressively stripped from the upper portion of the frozen mass, as illustrated in Figure 5. This stripping operation is performed by the consumer pulling the tab 16 to separate the overlapped glued edges of the side wall of the cup. In the event that the lid 12 does not come off the ice cream with the stripped upper portion of the cup, then this lid can be peeled off the top end of the frozen mass 20.

It should also be noted that in the event the bottom 11 is glued to the wall, it will be removed from the frozen mass at the same time that the lower half of the cup is stripped from the ice cream. On the other hand, if this bottom is not secured or glued to the wall of the cup, then, upon the removal of the lower half of the cup, the bottom will fall free.

I also desire it understood that while I have illustrated the cup as being provided with only one intermediate scored portion 15, the cup could, if so desired, have been provided with a plurality of such scored portions, resulting in the cup having more than two segments, each of which could be progressively removed from the cup by means of a separate stripping tab.

It is, of course, further understood that while I have illustrated and described in detail the preferred embodiment of the invention, the invention is not to be thus limited, but only in so far as defined by the scope and spirit of the appended claim.

I claim as my invention:

As an article of manufacture, a frusto-conical cap, adapted to function as a protective covering for the ice cream projecting above the upper edge of an edible cone, comprising a tapering wall formed open at its lower and smaller end and having a closure lid at its upper and larger end, said wall having a stripping tab for opening said wall to release said cap from its contents, and a frusto conical removable extension connected temporarily by a weakened zone to the smaller and open end of said cap, said extension including a tapering wall aligned with the wall of said cap and having a bottom in its lower and smaller end, said tapering wall of the extension also having a stripping tab for enabling said extension to be severed along said weakened zone from said cap.

THOMAS D. CURRIE.